Nov. 21, 1961 R. L. MILLS ET AL 3,010,069
MULTIPLICATION OF TWO FUNCTIONS
Filed Jan. 7, 1953 4 Sheets-Sheet 1

ROBERT L. MILLS
JOSEPH ZEMANEK JR.
INVENTORS

BY D. Carl Richards
ATTORNEY

Nov. 21, 1961  R. L. MILLS ET AL  3,010,069
MULTIPLICATION OF TWO FUNCTIONS
Filed Jan. 7, 1953                                    4 Sheets-Sheet 2

Fig. 5

ROBERT L. MILLS
JOSEPH ZEMANEK JR.
INVENTORS

BY D. Carl Richards
ATTORNEY

Nov. 21, 1961    R. L. MILLS ET AL    3,010,069
MULTIPLICATION OF TWO FUNCTIONS
Filed Jan. 7, 1953    4 Sheets-Sheet 3

ROBERT L. MILLS
JOSEPH ZEMANEK JR.
INVENTORS

BY D. Carl Richards
ATTORNEY

ROBERT L. MILLS
JOSEPH ZEMANEK JR.
INVENTORS

BY D. Carl Richards
ATTORNEY

United States Patent Office 3,010,069
Patented Nov. 21, 1961

3,010,069
MULTIPLICATION OF TWO FUNCTIONS
Robert L. Mills and Joseph Zemanek, Jr., Dallas, Tex., assignors, by mesne assignments, to Socony Mobil Oil Company, Inc.
Filed Jan. 7, 1953, Ser. No. 330,122
22 Claims. (Cl. 328—158)

This invention relates to multiplication of two functions, displacements, electrical voltages or currents, etc. and more particularly to carrier controlled production of a function which varies in proportion to the product of two functions.

Multiplication in the past has been accomplished electronically by systems and procedures which are either extremely complicated and involve a great deal of instrumentation when precision is required, or they do not truly yield a product but rather compromise accuracy in favor of low cost and/or simplicity. In the first category are systems in which the height of square-wave pulses is controlled by a first function and the width is controlled by a second function with the repetition rate held constant. The time integral of the output wave form is then proportional to the product of the two functions or, in other words, is proportional to the area of the square-wave pulses. An alternate scheme but very similar to the foregoing has been to control the pulse height (or the pulse width) with one function and the repetition rate of the square-wave pulses with another function. Both of the foregoing procedures require carefully controlled electronic circuits which make them extremely tedious and complex. Other procedures for multiplication have been based upon the use of impedances having a non-linear voltage-current characteristic where the operating point on the curve is controlled by the functions to be multiplied.

There still exists a need for a simple inexpensive means for accurately obtaining the product of two functions which vary in a complex manner in the time domain. Especially is this so in connection with wide frequency-band wattmeters, for computers in solving non-linear equations, for correlators in which a large signal to noise ratio is desired, and in numerous other applications.

In accordance with the present invention, multiplication of two complex functions is accomplished by producing an operating function which is a combination of a first of the two functions and an oscillatory function of frequency substantially differing from and of amplitude at least equal to the sum of the two complex functions. An output function is generated which varies in the time domain and is equal to the absolute magnitude of the operating function plus the second function minus the absolute magnitude of the operating function minus the second function. The frequency components lower than the frequency of the oscillatory functions then constitute the prdouct of the two complex functions.

Stated another way, the method may be described as including the steps of generating an output function $f_0$ of the following character $$f_0 = |S_1 + S_2| - |S_2 - S_2| \quad (1)$$

where $S_1$ equals one of two complex functions to be multiplied combined with a carrier function; and
$S_2$ equals the second of the functions to be multiplied.

The carrier function frequency components of the output function are then removed, leaving a true product function.

The invention comprehends the provision of a multiplying apparatus having high accuracy, wide dynamic range and stability sufficient for the most stringent of applications, but at the same time is only slightly more complicated than a conventional bridge network. So convenient and straightforward are the construction and operation of applicants' multiplying system that the practical considerations frequently given as reasons for requiring complex multipliers or for sacrificing accuracy in favor of costs or simplicity do not apply.

For a further understanding of the present invention and for a more complete description thereof, reference may now be had to the following description taken in conjunction with the accompanying drawings in which:

FIG. 5 is a circuit diagram of a multiplier.

Before turning to a detailed consideration of the drawings, it may be of assistance to keep in mind the fact that multiplication in accordance with applicants' preferred procedure is performed by the use of a phase discriminator bridge network, a bridge network constructed as to have zero output when either of two input voltages is zero. Further, multiplication is accomplished by the use of a carrier frequency voltage which is of substantially different frequency than either of the two functions to be multiplied and which is of amplitude of at least as great as the sum of the amplitudes of the two functions. Perhaps a most direct description of multiplication in accordance with the present invention is that a function is produced which has the form referred to in Equation 1, $$f_0 = |S_1 + S_2| - |S_1 - S_2|$$

where $S_1$ is the sum of the carrier frequency voltage and one of the functions to be multiplied; and
$S_2$ is simply the other of the functions to be multiplied.

Figures 1, 2, 4:
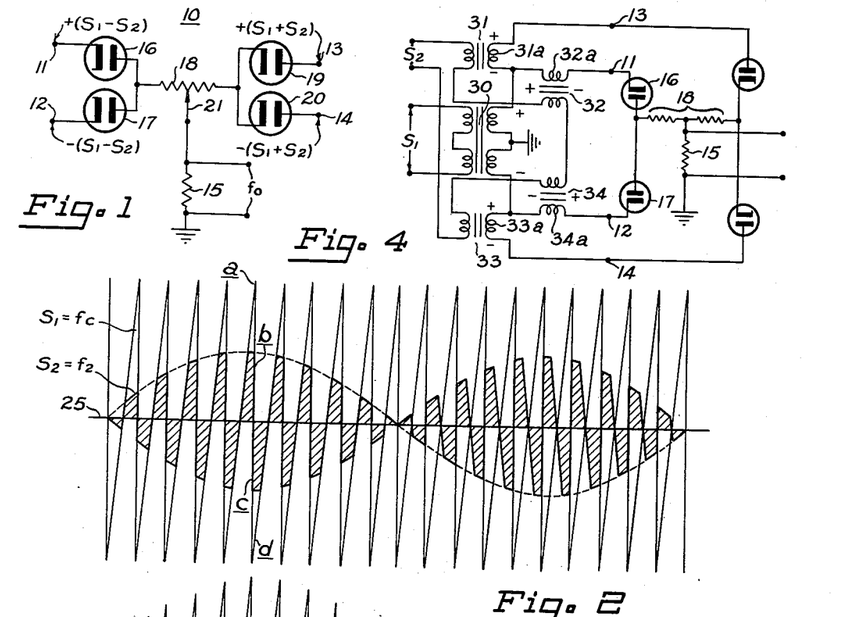
FIG. 1 illustrates in one form a network suitable for a multiplying operation.
FIG. 2 is a plot of wave forms illustrating multiplication of two input functions.
FIG. 4 is a more detailed circuit diagram of a voltage multiplier.

Keeping the foregoing in mind, refer now to FIG. 1. A combining network 10 is provided with four input terminals 11, 12, 13 and 14. Input voltage functions are applied between ground and terminals 11—14 to produce a rectified output voltage function across the load impedance 18. The anode of a third diode 19 is connected cathode is connected to input terminal 11. Similarly, the cathode of a second diode 17 is connected to input terminal 12. The anodes of diodes 16 and 17 are connected directly together and to one terminal of a balancing impedance 18. The anode of a third diode 17 is connected to input terminal 13, and similarly the anode of a fourth diode 20 is connected to input terminal 14. The cathodes of diodes 19 and 20 are connected directly together and to the second terminal of balancing impedance 18. The variable tap 21 on potentiometer 18 is connected to one terminal of output impedance 15 whose other terminal is connected to ground.

The circuit of FIG. 1 is one modification of the invention including a means for producing current flow through a single load resistor from a number of sources. As will hereinafter be explained, multiplication of two voltages is novel in this system in the provision of a circuit of the type here described together with the provision of voltages of particular character.

It will now be assumed that two voltages, currents or, in general, two functions, $f_1$ and $f_2$, are to be multiplied. One of the functions is modified by addition of a carrier function $f_c$. For convenience, consider that an operating function $S_1=f_1+f_c$, where $f_c$ is a carrier function, and that a second operating function $S_2=f_2$. $S_1$ and $S_2$ will now be applied to the combining network 10 of FIG. 1. A first signal is applied to input terminal 11 which has the character described by the expression $+(S_1-S_2)$. Similarly, a second function is applied to terminal 12 which is described by the expression $-(S_1-S_2)$. A third function $+(S_1+S_2)$ is applied to terminal 13. A fourth function $-(S_1+S_2)$ is applied to terminal 14. When these voltages are thus applied, the current in impedance 15 is proportional to the product of $f_1$ and $f_2$. Because of full wave rectification in diodes 16 and 17, the voltage at the left hand terminal of impedance 18 is the absolute magnitude of $-(S_1-S_2)$. Similarly, because of full wave rectification, the voltage at the right hand terminal of impedance 18 is the absolute magnitude of $+(S_1+S_2)$. The two voltages are then added in the network comprising impedances 15 and 18.

Figure 3:
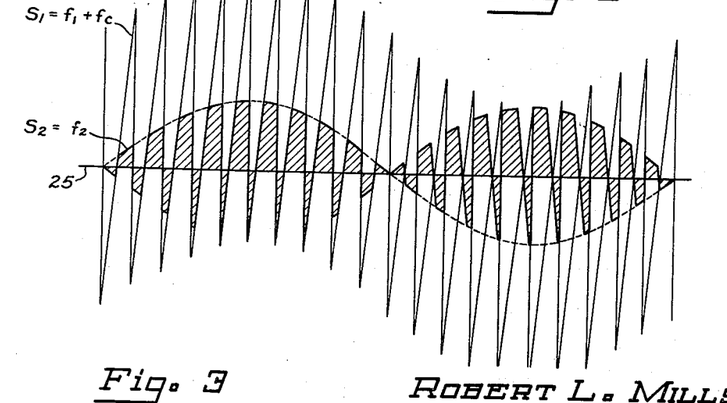
FIG. 3 is a plot of wave forms applied to the circuits of FIGS. 1 and 4 and illustrates the output therefrom.

The wave forms shown in FIGS. 2 and 3 illustrate a simple case. FIG. 2 illustrates $S_1$ as comprising only a carrier function $f_c$ which is of high frequency compared to the function $S_2$. The function $S_1$ is symmetrical with respect to axis 25. The second function $S_2=f_2$, a sine wave, is illustrated by the dotted curve.

Four voltages of the character indicated in FIG. 1 applied to terminals 11—14 produce current flow through the load resistor 15 which at any instant is proportional to and controlled by the smaller of the two signals and has a polarity or sense depending upon the signs of the two voltages. If $S_1$ and $S_2$ are both positive or both negative, current will flow from the top of resistor 15 to ground. If the voltages are of opposite relative polarities, current will flow from ground to the top of resistor 15.

To further illustrate the operation, consider the current flow through impedance 15 during each of four incremental time intervals $a$, $b$, $c$ and $d$ of FIG. 2.

*Interval a.*—Both $S_1$ and $S_2$ are positive and $S_1$ is greater than $S_2$. Under this condition terminal 11 is positive so diode 16 is blocked. Terminal 12 is negative so diode 17 is conductive and current through it is proportional to $-S_1+S_2$. Terminal 13 is positive so diode 19 is conductive and current through it is proportional to $+S_1+S_2$. Terminal 14 is negative so that diode 20 is blocked. Therefore the current through impedance 15, being equal to the sum of the currents through tubes 17 and 19, is positive in sense and in magnitude is proportional to $2S_2$, the smaller of the two signals.

*Interval b.*—Both $S_1$ and $S_2$ are positive but now $S_1$ is smaller than $S_2$. Diode 16 in this condition is conducting, the current through it being proportional to $+S_1-S_2$. Diode 17 is blocked. Diode 19 is conducting, since terminal 13 is positive, and current through diode 19 is proportional to $+S_1+S_2$. Diode 20 is blocked. The current in impedance 15 therefore is proportional to $2S_1$, i.e. positive and proportional to the smaller signal.

*Interval c.*—$S_1$ is negative and is smaller than $S_2$. At this point diode 16 conducts and diode 17 is blocked, the current through diode 16 being proportional to $-S_1-S_2$. Tube 20 is still blocked and diode 19 still conducts so that current during time interval $c$ is proportional to $-2S_1$, i.e. negative and proportional to the smaller of the two signals.

*Interval d.*—$S_1$ is negative but larger than $S_2$. Diode 16 is conducting, the current through it being proportional to $-S_1-S_2$. Diode 20 is conducting with current through it proportional to $+S_1-S_2$. Diodes 17 and 19 are blocked. Therefore during time interval $d$ the current is proportional to $-2S_2$, i.e. negative and proportional to the smaller signal.

The foregoing demonstrates that current flow is always proportional to the smaller of the two signals, is positive when both signals are of the same sign and negative when the signals are of opposite sign. In the second half of the cycle of the signal $S_2$, FIG. 2, the same reasoning applies and if carefully followed will reveal that the current flow is in accordance with the outline of the shaded areas. The addition of a first input function to the carrier voltage serves to shift the carrier relative to its zero axis in accordance with the first function. The operation of the second input function is to clip the shifted carrier voltage at levels with reference to the zero axis in accordance with the magnitude of the second input function.

A succession of pulses appears across impedance 15 at the frequency of the carrier function $f_c$. The pulses are generally polygonal in shape because the output is alternately proportional, first to the carrier function $f_c$ and then to the low frequency function $f_2$. Since the peak of the carrier function is much larger than the signal $f_2$, the latter limits the maximum height of the pulses. The relative width of the pulses depends upon the period of time that the carrier voltage is larger than the signal, i.e. the width of the pulses at the zero axis depends on the interval between carrier signal axis crossings. In FIG. 2 shaded areas above axis 25 are equal to the shaded areas below the axis so that if components of the output function $f_0$ of frequency equal to frequency of the carrier function $f_c$ and higher are eliminated, the output function $f_0$ will be zero.

Refer now to FIG. 3 where the function $S_1$ is equal to $(f_1+f_c)$. It will be seen that for the case here illustrated $f_1$ is a sine wave in phase with $f_2$ and is of amplitude equal to the amplitude of the function $f_2$. Shaded areas again represent flow of currents in impedance 15. It will be seen that considerable asymmetry with respect to axis 25 has been introduced so that if now components of frequency equal to and higher than the frequency of the carrier function $f_c$ are eliminated, there will be an output voltage whose amplitude is equal to the difference in the shaded areas above and below axis 25 and whose frequency is twice that of $f_1$ and $f_2$. This amplitude has been found to be directly proportional to the product of $f_1$ and $f_2$.

Upon a more detailed analysis it will be found that when either $f_1$ or $f_2$ is zero, the output across resistor 15 will be zero (except of course for the carrier and higher frequencies). Further, it will be seen that the carrier function may be combined with either function $f_1$ or function $f_2$ without altering the multiplying process.

While the foregoing description has dealt with multiplication in a particular case, two sine waves in phase coincidence, the same principles are applicable to complex waves and the output function will be correspondingly complex.

It will further be appreciated that the carrier function is not limited to the particular form illustrated in FIGS. 2 and 3. A saw-tooth wave form was shown because of its simplicity and because it so graphically portrays the multiplication process. The carrier function may be of any form substantially symmetrical to the zero axis so long as it slopes at least at alternate crossings of the zero axis. A limiting function which could not be used would be a square wave. Any wave form $f_c$ which will provide areal variations, within the amplitude limits of the unmixed multiplying function $f_1$ or $f_2$, as its apparent axis is shifted by reason of mixing with one of the functions $f_1$ or $f_2$, will be suitable for carrying out the multiplication process in an electrical system of the type disclosed in FIG. 1. Neither frequency stability nor absolute control of the amplitude of the carrier function is critical. Sweep generators of the type ordinarily found in cathode-ray oscilloscope devices, even without synchronization means, have been found to be satisfactory as carrier function sources.

The basic requirements that must be met for use in a circuit of the type shown in FIG. 1 are (1) one of the two functions to be multiplied must be combined with a carrier function of different frequency and not substantially smaller in magnitude than the sum of the peak values of the two functions to be multiplied, and (2) the four operating functions designated in FIG. 1 must be obtained and applied to the combining network for full wave rectification of all of the polarity variable permutations of $S_1$ and $S_2$ to obtain an output expressed by $$|S_1+S_2|-|S_1-S_2|$$

This output is then filtered to eliminate the carrier frequency components.

FIG. 4 illustrates a system that has been found particularly suitable for deriving the four operating functions. The combining network has been given the same reference characters as in FIG. 1. The signal $S_1$ is applied to the primary of a first transformer 30 which has a center tapped secondary winding. The secondary winding is connected at its upper terminal to the secondary winding 31a of a second transformer 31 and to the secondary winding 32a of a third transformer 32. Similarly, it is connected at the lower terminal to the secondary winding 33a of a fourth transformer 33 and to the secondary winding 34a of a fifth transformer 34. The primary windings of transformers 31, 32, 33 and 34 are connected in series and are energized by the signal $S_2$. The secondary winding 31a is connected to terminal 13 and the secondary winding 33a is connected to terminal 14. The secondary winding 32a is connected to terminal 11 and the secondary winding 34a is connected to terminal 12. The transformers 30—34 are interconnected such that, as voltages $S_1$ and $S_2$ instantaneously have the same polarities, the voltages in the secondaries will have the polarities indicated. If that is the case, the voltage between ground and terminal 11 is $+(S_1-S_2)$, the voltage between ground and terminal 12 is $-(S_1-S_2)$. The voltage between ground and terminal 13 is $+(S_1+S_2)$. The voltage between ground and terminal 14 is $-(S_1+S_2)$.

FIG. 5 is a schematic diagram of a circuit embodying the multiplying system of FIG. 4 together with suitable mixing and amplifying circuit components. The first function $f_1$ is applied to the input terminals 40—40a. The carrier function $f_c$ is applied to a second set of input terminals 41—41a. The second function $f_2$ is applied to a third pair of terminals 42—42a. The functions $f_1$ and $f_c$ are added together and are applied to the grid of a mixing tube 44. The output of tube 44 is connected by way of condenser 45 and potentiometer 46 to the grid of a first amplifying tube 47. The output of tube 47 is coupled by way of condenser 48 to the input grid in a phase inverting stage which includes tube 49. Equal and oppositely poled voltages are developed across the cathode resistor 50 and anode resistor 51, respectively. The latter voltages are then applied through condensers 52 and 53 to the input grids of a push-pull amplifier stage 54 comprised of tubes 54a and 54b. Transformer 55 has two primary windings connected to the anodes of tubes 54a and 54b, two secondary windings 55a and 55b and a tertiary winding 55c. The voltage induced in the series connected windings 55a and 55b and impressed across its shunting impedance 56 corresponds with the signal $S_1$.

The function $S_2$ (i.e. $f_2$) is applied through a potentiometer 57 to the grid of a first amplifying tube 58. The output of tube 58 is connected through the condenser 59 to a phase inverter which includes tube 60. Equal and oppositely poled voltages are developed across resistors 61 and 62. The latter voltages are applied through condensers 63 and 64 to the input grids of a push-pull amplifying stage 65 comprised of tubes 65a and 65b. The output circuit of amplifier 65 includes a transformer 66 which is identical with transformer 55. The voltages induced in the two secondary windings and impressed across the shunting impedances 67 and 68 correspond with the signal $S_2$.

In the upper amplifying channel the tertiary winding 55c is connected in a feed-back loop. More particularly, winding 55c is connected at one terminal to ground and through a connection including conductor 55d to the cathode biasing network 47a connected to tube 47. Similarly, the tertiary winding 66c in the bottom amplifying channel is connected at one terminal to ground and forms a portion of a second feed-back loop which includes the cathode biasing network 58a of tube 58. The separate stages of the amplifying channels are provided with circuits leading to a suitable B-supply such as battery 43. At the output of amplifier 54 the upper terminal of impedance 56 is connected by means of conductor 70 to the central point on impedance 67. Similarly, the lower terminal of impedance 56 is connected by way of conductor 71 to the center terminal on impedance 68. The center tap on impedance 56 is connected by way of conductor 73 to ground. It will now be seen that the output signals from the amplifier stages 54 and 65 are mixed and that the mixed function is of the type earlier described as suitable for multiplication. Further, points at the terminals of the impedances 67 and 68 may properly be given the same reference characters as the input terminals 11—14 of FIG. 1. More particularly, the voltage effective at point 13 is $+(S_1+S_2)$. The voltage at point 11 is $+(S_1-S_2)$, the voltage at point 12 is $-(S_1-S_2)$ and the voltage at point 14 is $-(S_1+S_2)$. The latter voltages applied to the diodes 16, 17, 19 and 20 produce current flow in the center tapped impedance 18 and through impedance 15 proportional to the product $f_1$ and $f_2$. The lower terminal of impedance 15 is connected to ground and the upper terminal is connected to the variable tap on a potentiometer 75 whose upper terminal in turn is connected by way of conductor 76 to an output circuit.

The impedance 77 and a meter 78 form a part of the output circuit and provide a means of measuring the magnitude of the output voltage. Also conductor 76 is connected to an impedance 79 which in turn is connected to one of a pair of output terminals 80. The second output terminal is connected to ground. A plurality of condensers 81—84 are arranged to be selectively connected across the output terminals 80 by operation of a selector switch 85. Condensers 81—84 in cooperation with impedances 77 and 79 serve to filter the output voltage so it is a unidirectional voltage proportional to the product of the two functions $f_1$ and $f_2$.

The filter including condensers 81—84 may be replaced by other filters to reach different results. For example, the voltage as it appears across impedance 15 will have a wave form of the type generically illustrated by the outline of the shaded areas in FIG. 3. Readily apparent are three primary components of this output. The first component is the carrier frequency and higher frequencies, as indicated by abrupt changes in slope. The second is a sinusoidal component of a frequency twice the frequency of $f_1$ and $f_2$. The third is a unidirectional component equal to the difference in the shaded areas above axis 25 and the shaded areas below axis 25.

When the output circuit of FIG. 5 includes one of the condensers 81—84 only the unidirectional component is transmitted to terminals 80. Eliminated are the carrier frequency components of $f_1$ and $f_2$. In many instances it may be desirable to produce and perhaps plot or display the product of multiplication showing its instantaneous values. In this case a filter is inserted in the output circuit, for example of the low pass type, which will eliminate only the components of the carrier frequency and higher, leaving the second harmonic and the unidirectional component. The latter procedure may be particularly desirable where the input functions $f_1$ and $f_2$ are more complex than the relatively simple case illustrated in FIG. 3.

For any operation, however, the output network including transformers 55 and 66 must be carefully balanced by proper adjustment of the center taps on impedances 56, 67 and 68. The foregoing center taps have been illustrated as being fixed and in operation may so be secured once balance has been obtained. The following procedure has been followed successfully to secure optimum balance. The tap on potentiometer 75 was moved to its upper terminal so that no voltage from tube 90 would be effective in the output circuit. A first input signal $f_1$ ($f_c$ and $f_2$ being zero) was applied to terminals 40, 40a. The tap on impedance 56 was then adjusted for a minimum output signal as indicated by an A.C. meter 78. Signal $f_1$ was then reduced to zero and a signal $f_2$ was applied to terminals 42, 42a. The taps on impedance 67 and 68 were then adjusted for minimum output indicated by meter 78. Since the foregoing two steps in the adjustment procedure were not completely independent, they were repeated two or three times. When this had been done, the signals $f_1$ and $f_2$ were both removed and the carrier signal $f_c$ was applied, and as a test for proper balance the output as measured by meter 78 was found to be zero. However the D.C. potential measured across terminals 80 was not zero so that the tap on potentiometer 75 was then adjusted and the switch 91 placed in such a position that the D.C. output at terminals 80 was zero. As a final check for proper balance, the D.C. output at terminals 80 was observed for increasing values of the signal $f_1$ with the signal $f_2$ kept at zero. The output was also observed for increasing values of $f_2$ with $f_1$ zero. In satisfying a fundamental requirement for multiplication, namely that the product is zero if either of the two functions is zero, the output at terminals 80 remained at zero during the latter two tests.

The introduction of a signal by variations of the tap on potentiometer 75 has been found to be desirable for the reason that a D.C. voltage appears in the output circuit due to thermal effects in the diodes of the multiplying circuit. This residual is compensated by adding triode 90. The triode 90 has its grid connected to its cathode and thence to a pair of terminals on a reversing switch 91. The anode similarly is connected to two terminals on the reversing switch 91. The armatures of the switch 91 are connected to the two terminals of the impedance 75. The voltage applied to the impedance 75, merely by reason of thermal agitation when the cathode of triode 90 is heated, has been found to be a compensation function for residual unbalance.

The system of FIG. 5 has been found to provide an output which accurately depicts the product of the two input functions $f_1$ and $f_2$, providing working voltages at the secondary terminals of the output transformers 55 andn 66 having r.m.s. values of approximately 150 volts. The system was found to be linear over a dynamic range greater than 500 to 1 and over a frequency band limited only by ability to provide a suitably high carrier frequency as to permit its elimination from the output.

The following circuit parameters were embodied in a system of the type disclosed in FIG. 5 and are to be taken by way of illustration only and not by way of limitation.

Tubes 44, 90 ______________ 6AB4.
Tubes (47, 49), (58, 60) ______ 12AJ7.
Tubes 54a, 54b, 65a, 65b ______ 6AQ5.
Transformers 55, 66 __________ LS-56, United Transformer Co.
B-Supply ____________________ 250 volts.
Impedance 56 ________________ 4,500 ohms.
Impedance 67, 68 ____________ 2,500 ohms.
Diodes (16, 17), (19, 20) ______ 6AL5.
Impedance 15 ________________ 10,000 ohms.
Impedance 18 ________________ 6,000 ohms.
Impedance 75 ________________ 2,000 ohms.
Impedance 79 ________________ 1,000 ohms.
Condenser 81 ________________ 1 mfd.
Condenser 82 ________________ 2 mfd.
Condenser 83 ________________ 4 mfd.
Condenser 84 ________________ 6 mfd.

The input functions $f_1$ and $f_2$ were in the frequency range below 200 c.p.s. while the carrier function was set first at 1,000 c.p.s. and later at 5,000 c.p.s. for equally effective operation. The circuit components not specifically designated above were so selected that the mixing, amplifying, phase inverting and power amplifying stages of FIG. 5 had a substantially flat frequency response to above 10 kilocycles so that operation was independent of frequency. The ratio of carrier amplitude to maximum low frequency signal amplitudes was set so that none of the stages of the $S_1$ channel were overdriven by the carrier function $f_c$ plus the signal $f_1$. The gain of the $S_2$ channel was set so that the peak value of the $f_2$ signal applied to terminals 42—42a was less than the minimum value of the envelope of $(f_c+f_1)$. Generally speaking, maximum output will be obtained when $f_c$ is at a value substantially equal to two-thirds the maximum undistorted signal that may be passed by the $S_1$ channel and when the peak values of $f_1$ and $f_2$ are the same and equal to one-half the peak value of the carrier function $f_c$.

Figure 6:
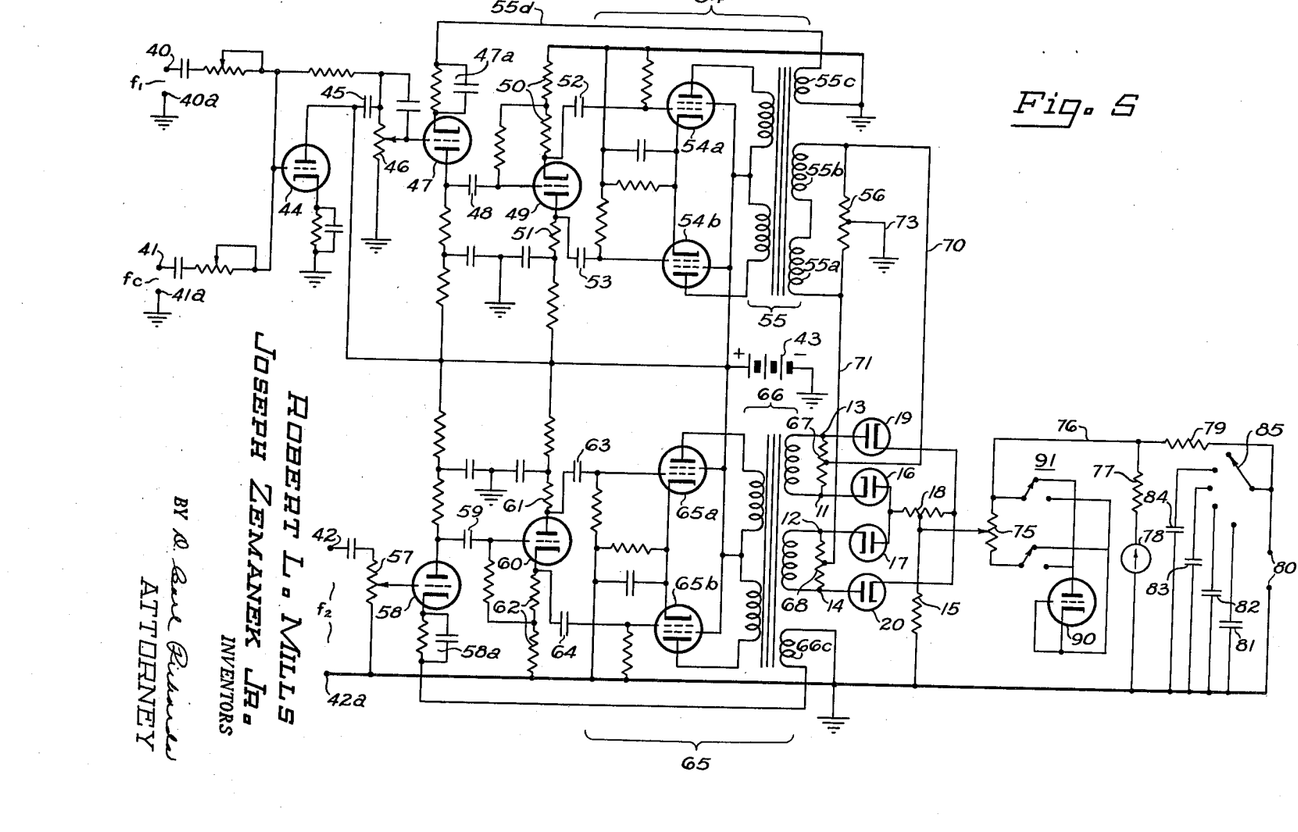
FIG. 6 is a graph illustrating the linearity and dynamic range of the multiplier of FIG. 5.

Referring now to FIG. 6, the amplitude of the output voltage from the circuit of FIG. 5 has been shown as a function of the amplitude of an input voltage $e_2$ (a specific $f_2$) in percent of a preferred limit. This limit is the minimum value of the envelope of the sum of a carrier voltage $e_c$ (of the form illustrated in FIG. 2) and a voltage $e_1$ mixed therewith (a specific $f_1$). It is to be noted that so long as the envelope of the combined voltages $(e_c+e_1)$ at its minimum value is greater than the maximum amplitude of the voltage $e_2$, the output from the multiplier circuit is linear, i.e. $e_1$ always controls pulse width and $e_2$ always controls pulse height. Further, there is but slight deviation from the desired linearity even though the voltage $e_2$ exceeds the preferred limit by substantial amounts. On the compressed scale used, the graph of FIG. 6 is of such low resolution that it illustrates only qualitatively the circuit operation. In order to appreciate the accuracy of the multiplication operation carried out in accordance with the present invention, the following values have been tabulated from a series of measurements made during multiplication operations of the type graphically illustrated in FIGS. 2 and 3.

| $e_2$/preferred limit | Linear output | Measured output | Percent deviation |
|---|---|---|---|
| 100 | 100 | 100 | 0 |
| 120 | 120 | 120 | 0 |
| 140 | 140 | 137 | 2.14 |
| 160 | 160 | 153 | 4.66 |
| 180 | 180 | 167 | 7.22 |

Figures 6, 7:
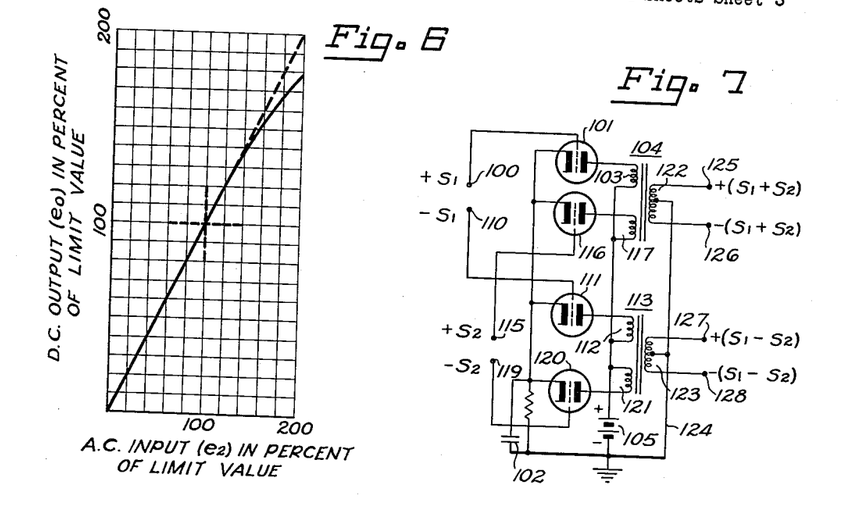
FIGS. 7 and 8 illustrate circuits for obtaining voltage functions suitable for multiplication.

Referring now to FIG. 7, there is illustrated an alternative scheme for producing the four output functions designated in FIG. 1. The signal $S_1$ is applied between ground and input terminal 100 which is connected to the grid of a first triode 101. The cathode of triode 101 is connected through a grid biasing network 102 to ground. The anode is connected to the first primary winding 103 of a transformer 104 and thence, by way of B-battery 105, to ground. Similarly a signal ($-S_1$) is applied between a second input terminal 110. The terminal 110 is connected to the input of a second triode 111 whose cathode is connected through network 102 to ground and whose anode is connected through a first primary winding 112 of transformer 113 to the B-battery 105. Signal $(+S_2)$ is applied between ground and a third input terminal 115 which is connected to the input grid of a third triode 116 whose cathode is connected through network 102 to ground and whose anode is connected through the second primary winding 117 of transformer 104 to the B-battery 105. Similarly a signal $(-S_2)$ is applied between ground and a fourth input terminal 119 which is connected to the grid of a fourth triode 120 whose cathode is connected through network 102 to ground and whose anode is connected through a second primary winding 121 of transformer 113 to the B-battery 105.

The primary windings 103 and 117 are so connected that when signals $S_1$ and $S_2$ instantaneously have the same polarity, currents will flow in the same direction through the windings. The primary windings 112 and 121 are so connected that when $S_1$ and $S_2$ have the same instantaneous polarity, currents will flow in opposite directions through the primary windings. The secondary windings 122 and 123 of transformers 104 and 113 each have a center tap which is connected by way of conductor 124 to ground. Therefore the signal between ground and the upper terminal 125 is equal to $+(S_1-S_2)$. Between ground and terminal 126 the signal is $-(S_1+S_2)$. Between terminal 128 and ground the signal is $-(S_1-S_2)$. Between ground and terminal 127 the signal is $+(S_1-S_2)$.

It is now apparent that the system of FIG. 7 may be utilized as an alternate for the transformer circuits of FIG. 4 for producing the four desired operating functions.

Figure 8:
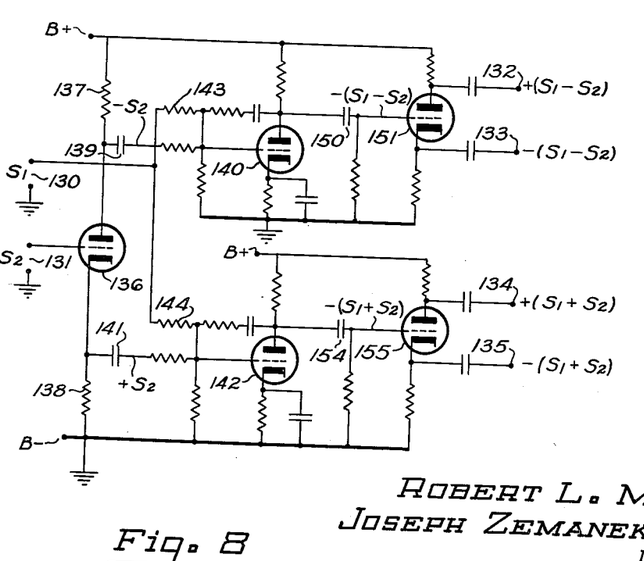

Another suitable circuit is illustrated in FIG. 8. If the signal $S_1$ is applied to input terminals 130 and the signal $S_2$ applied to input terminals 131, four operating functions will appear between the ground terminal and the output terminals 132, 133, 134 and 135, respectively. The signal $S_2$ is applied to the grid of a first triode 136. Voltages of equal and opposite polarity and proportional to $S_2$ are developed across plate resistor 137 and cathode resistor 138. A signal $(-S_2)$ is then coupled through condenser 139 to a grid of a second triode 140. A signal $(+S_2)$ is connected through condenser 141 to the grid of a third triode 142. Signal $(S_1)$ is mixed with signal $(-S_2)$ through resistor 143 connected to the grid of tube 140, and signal $(S_1)$ is mixed with the signal $(+S_2)$ through resistor 144 connected to the grid of tube 142.

The output of tube 140 $-(S_1-S_2)$ is coupled through condenser 150 to the grid of tube 151. The voltage at the plate of tube 151 and coupled to terminal 132 is $+(S_1-S_2)$. The voltage at the cathode of tube 151 and coupled to terminal 133 is $-(S_1-S_2)$. Similarly when the output of tube 142, $-(S_1+S_2)$, is coupled by way of condenser 154 to the grid of tube 155, the voltage at the plate of tube 155 and coupled to terminal 134 is $+(S_1+S_2)$, and the voltage at the cathode of tube 155 and coupled to the terminal 135 is $-(S_1+S_2)$.

Figure 9:
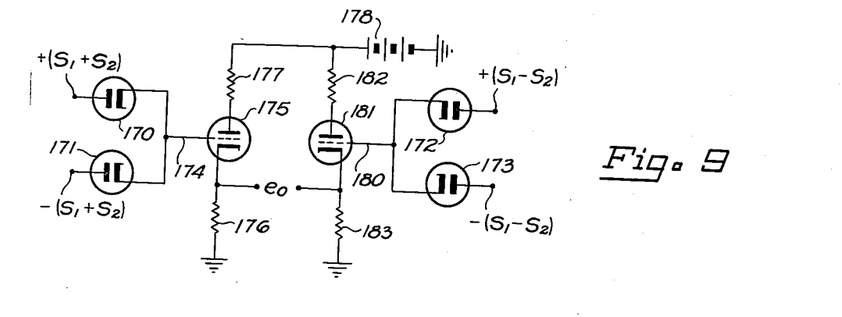
FIG. 9 is a modification of the system of FIG. 1.

Referring again to FIG. 1, it will be seen that the function of the network comprising impedances 15 and 18 between diodes 16, 17, 19 and 20 is merely to add the voltage at the anodes of diodes 16 and 17 to the voltage at the cathodes of diodes 19 and 20. FIG. 9 illustrates a modification of FIG. 1. This system includes four diodes 170, 171, 172 and 173. The cathodes of diodes 170 and 171 are connected directly together and, by way of conductor 174, to the input grid of a tube 175. The cathode of tube 175 is connected by way of resistor 176 to ground. The anode is connected by way of resistor 177 to the positive terminal of a battery 178 whose negative terminal is connected to ground. Similarly, the cathodes of tubes 172 and 173 are connected directly together and by way of conductor 180 to the control grid of a second triode 181. The anode circuit of tube 181 includes a resistor 182 and the cathode circuit, a resistor 183.

Using the same nomenclature as in FIG. 1, a voltage $+(S_1+S_2)$ is applied between ground and the anode of tube 170. A voltage $-(S_1+S_2)$ is applied between the anode of diode 171 and ground. A voltage $+(S_1-S_2)$ is applied between the anode of tube 172 and ground, and a voltage $-(S_1-S_2)$ is applied between the anode of tube 173 and ground. The voltage between ground and conductor 174 is $+|S_1+S_2|$, i.e. the absolute magnitude of $(S_1+S_2)$. Similarly, the voltage between conductor 180 and ground is $+|S_1-S_2|$. Multiplication is performed in this system if Equation 1 is satisfied. To accomplish this, the voltage on conductor 180 is subtracted from the voltage on conductor 174. The difference $e_0$ appears between the cathodes of the triodes 175 and 181. The frequency components of $e_0$ below the frequency of the carrier are product voltages. Thus the system of FIG. 9 is an alternative means for carrying out multiplication using the polarity variable permutations of $S_1$ and $S_2$.

Figures 10, 11:
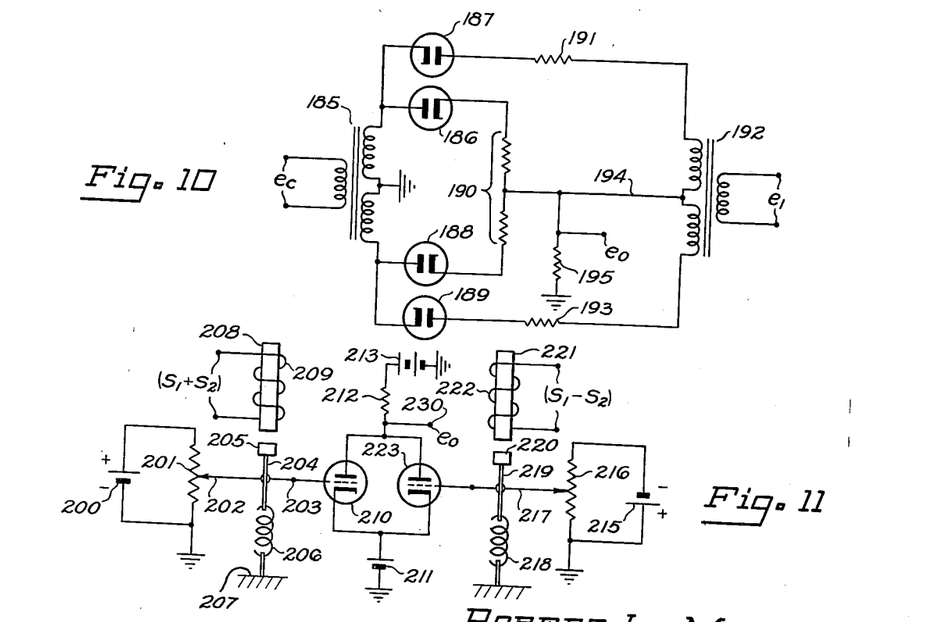
FIG. 10 is a squaring circuit.
FIG. 11 is a modification of the invention.

FIG. 10 is a schematic diagram of a squaring circuit. In this system a carrier voltage $e_c$ is applied to a first input transformer 185. The secondary winding of transformer 185 has its center tap connected to ground and is connected at its upper terminal to the anode of a first diode 186 and to the cathode of a second diode 187. Similarly, it is connected at its lower terminal to the anode of a third diode 188 and to the cathode of a fourth diode 189. The cathodes of diodes 186 and 188 are coupled together by way of center tapped impedance 190. The anodes of diodes 187 and 189 are interconnected by way of a series circuit which includes an impedance 191, the center tapped secondary winding of a second transformer 192 and a second impedance 193. Conductor 194 couples the center tap of transformer 192 to the center point on impedance 190. A voltage $e_1$ is applied to the input of transformer 192. An output impedance 195 is connected between ground and conductor 194. A carrier controlled voltage is developed across the latter impedance which is proportional to the square of the voltage $e_1$. The output voltage, absent the carrier frequency components, is a linear function of the square of $e_1$ so long as $e_1$ does not exceed the magnitude of the carrier $e_c$. The earlier description of multiplication in FIG. 1 is applicable to the circuit of FIG. 10. However, it will be seen that some elements of FIG. 1 have been eliminated. This is possible because of the more elementary character of the two input functions. Nevertheless there is developed the necessary functions for multiplication in accordance with Equation 1. This is a particular case in which $e_1$ equals zero and in which the polarity variable permutations of $S_1$ and $S_2$ are effective in producing the current flow in impedance 195.

The system illustrated in FIG. 11 is another modification of a system for performing multiplication in accordance with Equation 1. A D.C. source such as a battery 200 is connected in a first series circuit including a potentiometer 201. The lower terminal of potentiometer 201 is connected to ground and to the negative terminal of the source 200. The variable tap or arm 202 of potentiometer 201 is pivoted at point 203. A link 204 is coupled to the arm 202 at an intermediate point thereof and supports at its upper end an armature 205 of magnetic material. The lower end of the link 204 is fastened to the upper end of the spring 206 which is anchored at its lower end to a frame member 207. An electromagnetic device 208 is positioned adjacent the armature 205 and carries a winding 209 which is excited by application thereto of a signal $(S_1+S_2)$. When $(S_1+S_2)$ is zero, spring 206 pulls the arm 202 to a zero voltage position (at the lower end of potentiometer 201). The voltage between the arm 202 and ground is thus made to vary in accordance with $(S_1+S_2)$.

The arm 202 is electrically connected to the input grid of a triode 210 whose cathode is connected by way of bias battery 211 to ground. The anode of tube 210 is connected by way of impedance 212 to the positive terminal of a battery 213. Current flow from tube 210 through resistor 212 is thus made proportional to $(S_1+S_2)$.

A second series circuit including a D.C. source such as battery 215 and potentiometer 216 is so connected that the positive terminal 215 and the lower terminal of potentiometer 216 are connected to ground. The variable arm 217 of the potentiometer 216 normally is mechanically biased by the spring 218 to its zero potential (lower) position. A link 219 coupled to arm 217 carries an armature 220 at its upper end adjacent an electromagnetic device 221. Winding 222 excites the magnetic device upon application thereto of an applied voltage $(S_1-S_2)$. Arm 217 is electrically connected to the input grid of a second triode 223 whose cathode and plate are connected to the cathode and plate, respectively, of tube 210. Since battery 215 has its polarity opposite that of battery 200, current flow through impedance 212 from tube 223 is representative of the function $-(S_1-S_2)$. Since the magnetic forces on armatures 205 and 220 are independent of polarity, the currents from tube 210 and tube 223 are proportional to the absolute magnitude of $|S_1+S_2|$ and $-|S_1-S_2|$, respectively. If $S_1$ is the combination of a carrier function $f_c$ and a voltage function $f_1$ and the signal $S_2$ is a second voltage function $f_2$, then the voltage at the anodes of tubes 210 and 223 is representative of the product of $f_1$ and $f_2$. Thus the voltage appearing at the output point 230 may be filtered to eliminate the carrier frequency components and thus leave a function which is the product of $f_1$ and $f_2$. The average value of the voltage at point 230 may be obtained by further filtering to produce a D.C. voltage proportional to the product.

In this system it will be understood that because of mechanical movements the frequency range involved necessarily will be limited to much lower frequencies than the all-electronic operation possible with the system of FIG. 1. However in both systems the carrier controlled multiplication of two functions is accomplished.

It will now be appreciated that one function may be multiplied by a second function by generating a carrier function which has positive and negative half-cycles of shape wherein displacement of the carrier with respect to its zero axis complementarily changes the spacing between the intercepts on said axis of the positive half-cycles relative to those of the negative half-cycles. The carrier is displaced relative to its zero axis in accordance with the first function to produce the complementary changes between intercepts, and then the displaced carrier is compared with the second function and an output signal is generated having a magnitude determined by the lesser of the instantaneous values of the displaced carrier and the second function and having one instantaneous sign when the values are of like sign (positive or negative) and of opposite sign when the values are of different sign.

Having described the invention in connection with the systems illustrated in the drawings, it will now be appreciated that in theory at least the method may be performed manually. A carrier function may be combined with a first function to be multiplied to displace the carrier function with reference to its zero axis in a manner illustrated in FIG. 3, namely by the signal $S_1$. This operation may be done graphically. The displaced carrier function may then be superimposed upon the second of the two functions to be multiplied on compatible time and amplitude scales to outline areas above and below the axis corresponding with or representative of current flow in a suitable multiplying circuit. The algebraic summation of the areas above and below the zero axis may then be accomplished by an integration operation such as through the use of a planimeter manually caused to circumscribe selected areas determined by the relations between the superimposed functions. The difference in the areas above the axis and below the axis is proportional to the product of the two functions to be multiplied.

The method may be carried out as above described through a manual operation, it may be carried out by controlling in a particular manner the operation of a discriminator network or it may be carried out by use of a system such as illustrated in FIG. 11 where magnetic fields are utilized to produce the absolute magnitudes of the sum and the difference of two functions. The resultant product may be in the form of a unidirectional voltage or it may be allowed to vary in accordance with the instantaneous values of the product of complex input functions.

While the above description is principally in terms of alternating currents as input functions, it is to be understood, of course, if one of the signals or both be direct current, or unidirectional functions, the system will continue to multiply one by the other.

The two functions may be multiplied by the use of any means for producing the full wave rectified combination of polarity variable permutations of the first of the two functions and of the second of the two functions combined with the carrier function. The preferable form of apparatus for carrying out the present invention involves the use of a full wave rectifying discriminator in which conductivities are controlled primarily by a carrier function and in which the variations in conductivities are produced by the action of the two functions to be multiplied. Broadly, the discriminator is a means for producing the difference between the absolute magnitudes of the sum and the difference of one of the two functions and the combination of the second of the two functions and a carrier function.

While the invention has been illustrated and described in connection with several modifications thereof, it will be apparent that other modifications may now suggest themselves to those skilled in the art and it is intended to cover such modifications as fall within the scope of the appended claims.

What is claimed is:

1. A system for multiplying two input voltages which comprises a source of carrier frequency voltage, means for algebraically adding said carrier frequency voltage and one of said input voltages to produce an operating voltage representative of the algebraic sum thereof, means for producing a first voltage function which varies in accordance with the absolute magnitude of the sum of said operating voltage and the second of said input voltages, means for producing a second voltage function which varies in accordance with the absolute magnitude of the difference of said operating voltage and the second of said input voltages, means for combining said first and second voltage functions, and means for separating from the combination of said functions, components of frequency lower than the frequency of said carrier voltage whereby said components are proportional to the product of said input voltages.

2. A system for multiplying two input voltages which comprises a source of carrier frequency voltage, means for algebraically adding said carrier frequency voltage and one of said input voltages to produce an operating voltage representative of the algebraic sum thereof, electronic means for producing a first voltage function which varies in accordance with the absolute magnitude of the sum of said operating voltage and the second of said input voltages, electronic means for producing a second voltage function which varies in accordance with the absolute magnitude of the difference of said operating voltage and the second of said input voltages, means for combining said functions, and means for separating from the combination of said functions, components of frequency lower than the frequency of said carrier voltage whereby said components are proportional to the product of said input voltages.

3. A system for multiplying two input voltages which comprises a source of carrier frequency voltage, means for algebraically adding said carrier frequency voltage and one of said input voltages to produce an output voltage representative of the algebraic sum thereof, electromechanical means for producing a first function which varies in accordance with the absolute magnitude of the sum of said operating voltage and the second of said input voltages, electromechanical means for producing a second function which varies in accordance with the absolute magnitude of the difference of said operating voltage and the second of said input voltages, means for combining said functions, and means for separating from the combination of said functions, components of frequency lower than the frequency of said carrier voltage whereby said components are proportional to the product of said input voltages.

4. A system for multiplying two input voltages which comprises a source of carrier frequency voltage, means for algebraically adding said carrier frequency voltage and one of said input voltages to produce an output voltage representative of the algebraic sum thereof, means for producing a first function which varies in accordance with the absolute magnitude of the sum of said operating voltage and the second of said input voltages, means for producing a second function which varies in accordance with the negative of the absolute magnitude of the difference of said operating voltage and the second of said input voltages, means for adding said functions, and means for separating from the sum of said functions, components of frequency lower than the frequency of said carrier voltage whereby said components are proportional to the product of said input voltages.

5. A system for multiplying two input voltages which comprises a source of carrier frequency voltage, means for algebraically adding said carrier frequency voltage and one of said input voltages to produce an output voltage representative of the algebraic sum thereof, means for producing a first function which varies in accordance with the absolute magnitude of the sum of said operating voltage and the second of said input voltages, means for producing a second function which varies in accordance with the absolute magnitude of the difference of said operating voltage and the second of said input voltages, means for subtracting said second function from said first function, and means for separating from the difference between functions, components of frequency lower than the frequency of said carrier voltage whereby said components are proportional to the product of said input voltages.

6. A system for producing an output voltage proportional to the product of a first input voltage and a second input voltage which comprises means for algebraically adding a carrier voltage and said first input voltage to produce an operating voltage representative of the algebraic sum thereof, means for generating four voltages representative of the four polarity-variable permutations of said operating voltage and said second input voltage, a common means for generating a time varying condition corresponding with the simultaneous full wave rectification of said four voltages, and means for separating from said time varying condition, components other than those corresponding with said carrier voltage.

7. A system for producing an output voltage proportional to the product of a first input voltage and a second input voltage which comprises means for algebraically adding a carrier voltage and said first input voltage to produce an operating voltage representative of the algebraic sum thereof, means for generating the four polarity-variable permutations of said operating voltage and said second input voltage, four unidirectionally conductive circuits having a common terminus for producing current flow to or from said terminus which varies in magnitude in accordance with the instantaneously smaller of said operating voltage and said second input voltage and in direction in dependence upon similarity or dissimilarity of the signs of said operating voltage and said second input voltage, and means for separating from currents flowing to or from said terminus, components of frequency lower than the frequency of said carrier.

8. In a system for multiplying two electrical functions to form a product voltage at output terminals thereof the combination which comprises an independent source of voltage having a frequency high compared to the frequency of either of said two functions and amplitude not substantially less than the sum of said two functions, means for algebraically adding said voltage to one of said functions to produce an operating function representative of the algebraic sum thereof, a load impedance connected across said output terminals, four unilaterally conductive circuits connected between said output terminals, two of which are arranged for conducting current in one direction through said load impedance and the other two arranged for conducting current in the opposite direction through said load impedance, means for applying to a first of said circuits the difference between said operating function and the second of said electrical functions, means for applying to the second of said circuits the difference between the second of said functions and the operating function, means for applying to the third of said circuits the sum of the operating function and the second of said functions, means for applying to the fourth of said circuits the negative sum of said functions whereby current flows through said load impedance to produce an output voltage which is instantaneously proportional to the smaller of said operating voltage or the second of said functions, and means for separating from said output voltage, frequency components lower than the frequency of said independent voltage.

9. A system for multiplying two input voltages which comprises an output circuit, a source of carrier frequency voltage, means for algebraically adding one of said voltages and said carrier voltage to produce an operating voltage representative of the algebraic sum thereof, means for controlling current flow in said output circuit instantaneously proportional to the smaller of said operating voltage and the second of said input voltages, an impedance element having a pair of terminals and having an intermediate connection common to said output circuit, said means for controlling current flow comprising a pair of electric circuits each including rectifiers and each connected to different terminals of said impedance element and each of said rectifiers excited by different voltages each representative of one of four polarity-variable permutations of said operating voltage and said second voltage for controlling current flow to said intermediate connection, and means for separating from the voltage produced in said output circuit by said current flow components lower than the frequency of said carrier whereby said components are proportional to the product of said two input voltages.

10. A system for multiplying two input voltages which comprises an output impedance having a pair of terminals, a source of carrier frequency voltage, means for algebraically adding one of said voltages and said carrier voltage to produce an operating voltage representative of the algebraic sum thereof, means for producing current flow in said output impedance which varies instantaneously as the smaller of said operating voltage and the second of said input voltages comprising means for producing four voltages representative of the four polarity-variable permutations of said operating voltage and the second of said input voltages, an impedance element having a pair of terminals and having an intermediate connection common to one terminal of said output impedance, a pair of electric circuits each including rectifiers and each connected to different terminals of said impedance element and each of said rectifiers excited by one of said four voltages for controlling current flow to said intermediate connection and through said output impedance, and means for measuring components of current flow through said impedance of frequency lower than the frequency of said carrier voltage.

11. A system having two pairs of input terminals and one pair of output terminals for producing an output voltage proportional to the product of a first input voltage applied to one pair of input terminals and a second input voltage applied to the second pair of input terminals, a source of carrier frequency voltage connected in circuit with one of said pair of input terminals for algebraically adding said carrier frequency voltage and said first input voltage representative of the algebraic sum thereof, an output impedance in circuit with said output terminals, a first circuit means interconnecting said input terminals and said output terminals for producing a first voltage proportional to the absolute magnitude of the sum of said operating voltage and said second input voltage, a second circuit means interconnecting said input terminals and said output terminals for producing a second voltage proportional to the absolute magnitude of the difference between said operating voltage and said second input voltage, circuit means for producing current flow in said impedance proportional to the difference in the absolute magnitudes of said first voltage and said second voltage, and filter means connected across said output impedance for producing a unidirectional voltage proportional to the average of said current flow whereby said voltage is proportional to the product of said two input functions.

12. A circuit for multiplying a first and second input voltage which comprises a source of carrier frequency voltage, adding means in circuit with said source for combining said first input voltage with said carrier frequency voltage to produce an operating voltage, a pair of rectifiers having a common cathode connection, a first circuit leading from said adding means to the anode of one of said rectifiers for applying the sum of said operating voltage and said second input voltage thereto, a second circuit means leading from said adding means to the anode of the second of said rectifiers for applying in a negative sense the sum of said operating voltage and said second input voltage, a second pair of rectifiers having a common anode connection, a third circuit leading from said adding means to the cathode of one of said second pair of rectifiers for applying thereto the difference between said operating voltage and said second input voltage, a fourth circuit leading from said adding means to the cathode of the second of said second pair of rectifiers for applying thereto in a negative sense the difference between said operating voltage and said second input voltage, an adding network connected between said common cathode connection and said common anode connection comprising a center tapped impedance and output impedance connected at one terminal thereof to said center tap and at the other terminal thereof to a common terminal at said adding means, and filter means connected across said output impedance for eliminating from the voltage developed thereacross frequency components lower than said carrier frequency.

13. A squaring circuit which comprises a first transformer having a center tapped secondary winding, a first series circuit connected across the extremities of the secondary windings of said first transformer comprising a unilaterally conductive element, a center tapped impedance and a second unilaterally conductive element poled opposite said first element, a second series circuit connected across the extremities of the secondary windings of said first transformer comprising a third unilaterally conductive element, a center tapped secondary winding of a second transformer and a fourth unilaterally conductive circuit element with said third and fourth elements poled opposite each other and respectively opposite the first and second elements, an input circuit including the primary winding of said second transformer for receiving a signal voltage, an output impedance connected at one terminal thereof to the center tap on the secondary winding of said first transformer and at the other terminal thereof to the center tap on the secondary winding of said second transformer and to the center tap on said impedance in said first series circuit, a source of alternating voltage of frequency high compared to the frequency of said signal voltage and amplitude not substantially less than the amplitude of said signal voltage connected to the primary winding of said first transformer, and filter means connected across said output for eliminating components of frequency equal to and higher than the frequency of said carrier voltage.

14. A system for multiplying a first and second input voltage which comprises a source of alternating voltage having frequency high compared to the frequency of said input voltages and of amplitude not substantially less than the sum of the amplitudes of said input voltages, algebraic adding means for combining said alternating voltage and said first input voltage representative of the algebraic sum thereof, circuit means connected to said adding means for producing a magnetic field which varies in intensity in proportion to variations in the sum of said operating voltage and said second input voltage, a second circuit including means for producing a magnetic field which varies in proportion to variations in the difference between said operating voltage and said second input voltage, a pair of voltage generators, magnetic means linking said generators to said magnetic field producing means for maintaining the outputs of said generators proportional to said magnetic fields, combining means connected to said generators for subtracting the output of one of said generators from the output of the other of said generators to produce an output voltage, and means for separating from said output voltage components of frequency lower than the frequency of said carrier voltage.

15. The combination with a discriminator circuit including at least a pair of unidirectional conducting devices, of means for applying to the discriminator a carrier signal, means for applying to the discriminator a second signal for shifting said carrier relative to its zero time axis in accordance with the amplitude of said second signal, means for applying to the discriminator a third signal, and means for developing an output from said discriminator related to the degree of shift of said carrier from its zero axis and to the relative amplitudes between two of said input signals one of them being the amplitude of the carrier and the other being the amplitude of said third signal, and the instantaneous output being related to the lesser of the two.

16. The combination, with a phase discriminator network having two input circuits for producing at an output circuit a full-wave rectified voltage, which comprises a source of carrier frequency voltage connected to one of said input circuits, means for shifting said carrier relative to its zero axis in accordance with a first input function, means for clipping said carrier voltage at levels with reference to said zero axis in accordance with a second input function, and a filter network in said output circuit for eliminating from said output voltage frequency components equal to and higher than the frequency of said carrier voltage whereby the output of said discriminator is proportional to the product of said input functions.

17. The method of producing the product of a first function and a second function which comprises generating a carrier having with respect to a zero axis positive and negative half-cycles of shape wherein displacement of the carrier with respect to said axis complementarily changes the spacing between the intercepts on said axis of the positive half-cycles relative to those of the negative half-cycles, the maximum amplitude of said carrier being at least equal to the sum of the maximum amplitudes of said first and second functions and the shape of said carrier having that symmetry which maintains equality of spacing between any one intercept and any intercept twice removed therefrom, displacing the position of the carrier relative to said zero axis in accordance with said first function to produce said complementary changes between said intercepts, generating from said displaced carrier and from said second function an output function comprising alternately occurring positive pulses and negative pulses of amplitudes respectively determined by the smaller of the amplitudes of said displaced carrier and of said second function and of one sign when said amplitudes are of like sign (either both positive or both negative) and of opposite sign when said values are of different sign, and averaging the algebraic summation of said positive pulses and of said negative pulses for producing an output signal representative of the product of said first function multiplied by said second function.

18. The method of multiplying two functions which comprises generating an oscillatory function of frequency higher than that of either of said two functions and of amplitude greater than that of either of said two functions, algebraically adding a first of said two functions and said oscillatory function to produce an operating function representative of the algebraic sum thereof, combining the second of said two input functions and said operating function to produce an output function equal to the absolute magnitude of said operating function plus the second of said two functions minus the absolute magnitude of said operating function minus the second of said two functions, and separating from said output function components thereof representative of the product of said two functions having frequencies lower than the frequency of said oscillatory function.

19. The method of multiplying two functions varying on a time scale which comprises generating an oscillatory function of frequency higher than that of either of said two functions and at least equal in amplitude to the sum of said two functions, algebraically adding the first of said two functions to said oscillatory function to produce a third function representative of the algebraic sum thereof, generating a fourth function which is proportional at any instant along said time scale to the amplitude of the smaller of the second of said two functions and said third function, and separating from said fourth function components thereof of frequencies lower than the frequency of said oscillatory function, said components being representative of the product of said two functions.

20. The method of multiplying two functions which comprises producing an oscillatory function of a frequency higher than that of either of said two functions and of amplitude greater than that of either of said two functions, algebraically adding a first of said two functions and said oscillatory function to produce a combined function representative of the algebraic sum thereof, superimposing said combined function on the second of said two functions to produce a fourth function, and integrating said fourth function to produce a function representative of the product of said two functions having a magnitude which varies progressively along a time scale in accordance with the smaller of the instantaneous values of said second function and the combined functions.

21. The method of multiplying two alternating current signals which comprises generating an oscillatory function of frequency substantially differing from either of said two signals and of amplitude not substantially less than the sum of said two signals, algebraically adding a first of said two signals and said oscillatory function to produce an operating function representative of the algebraic sum thereof, producing a first sum by adding said operating function to the second of said two signals, full-wave rectifying said first sum to produce a first output signal equal to the absolute magnitude of said first sum, producing a second sum by adding said operating function to the negative of the second of said two signals, full-wave rectifying said second sum to produce a second output signal equal to the absolute magnitude of said second sum, combining said first and second output signals in a common impedance, and separating from the signal in said impedance, components having frequencies lower than the frequency of said oscillatory function, said components being representative of the product of said two signals.

22. A system for multiplying two functions which comprises a source for generating a carrier having a frequency higher than that of either of said two functions and of amplitude greater than that of said two functions, a combining circuit to which a first of said two functions is applied and to which said carrier is applied for producing an operating function representative of the algebraic sum of said carrier and said first of said two functions, a combining circuit to which said operating function is applied and to which the second of said two input functions is applied for producing an output function representative of the absolute magnitude of said operating function plus the second of said two functions minus the absolute magnitude of said operating function minus the second of said two functions, and separating means to which said output function is applied for separating therefrom components having frequencies lower than the frequency of said carrier, said separated components being representative of the product of said two functions.

References Cited in the file of this patent

UNITED STATES PATENTS

| | | |
|---|---|---|
| 2,244,369 | Martin | June 3, 1941 |
| 2,322,218 | Baird | June 22, 1943 |
| 2,397,961 | Harris | Apr. 9, 1946 |
| 2,429,636 | McCoy | Oct. 28, 1947 |
| 2,440,465 | Ferguson | Apr. 27, 1948 |
| 2,519,223 | Cheek | Aug. 15, 1950 |
| 2,584,986 | Clark | Feb. 12, 1952 |
| 2,700,135 | Tolles | Jan. 18, 1955 |

UNITED STATES PATENT OFFICE
CERTIFICATION OF CORRECTION

Patent No. 3,010,069                                        November 21, 1961

Robert L. Mills et al.

It is hereby certified that error appears in the above numbered patent requiring correction and that the said Letters Patent should read as corrected below.

In the grant, lines 2 and 3, for "assignors, by mesne assignments, to Socony Mobil Oil Company, Inc.," read -- assignors, by mesne assignments, to Socony Mobil Oil Company, Inc., a corporation of New York, --; in the heading to the printed specification, lines 4 and 5, for "assignors, by mesne assignments, to Socony Mobil Oil Company, Inc." read -- assignors, by mesne assignments, to Socony Mobil Oil Company, Inc., a corporation of New York --; column 1, line 57, for "prdouct" read -- product --; line 61, equation (1) should appear as shown below instead of as in the patent:

$$f_0 = \left| S_1 + S_2 \right| - \left| S_1 - S_2 \right|$$

column 2, line 55, for "18. The anode of a third diode 19 is connected" read -- 15. The circuit includes a first diode 16 whose --; line 60, for "17" read -- 19 --; column 6, line 15, "At the output" should be the beginning of a new paragraph; column 7, line 57, for "andn" read -- and --; column 9, line 23, for "+($S_1 - S_2$)" read -- +($S_1 + S_2$) --; column 12, line 13, for "lternating" read -- alternating --; column 15, line 50, after "and" insert -- an --.

Signed and sealed this 10th day of April 1962.

(SEAL)
Attest:

ERNEST W. SWIDER                                        DAVID L. LADD
Attesting Officer                                         Commissioner of Patents